Figure 1:
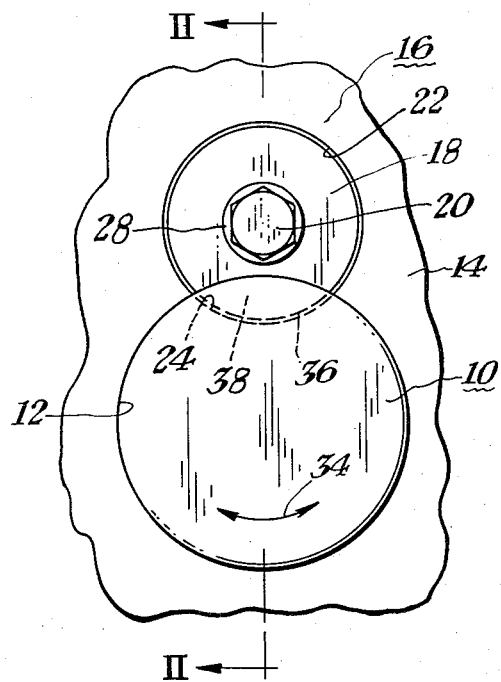

United States Patent [19]
Petros

[11] 3,797,949
[45] Mar. 19, 1974

[54] KEEPER FOR RETAINING A PIN OR SHAFT
[75] Inventor: Andrew J. Petros, Oakdale, Pa.
[73] Assignee: Mesta Machine Company, Pittsburgh, Pa.
[22] Filed: July 3, 1972
[21] Appl. No.: 268,896

[52] U.S. Cl. .............................................. 403/355
[51] Int. Cl. ............................................. F16d 1/06
[58] Field of Search.......... 287/52.05, 53 LK, 53 R, 287/52.06, 52.09, 53 TK, 52 R; 408/241 B; 279/76; 85/7

[56] References Cited
UNITED STATES PATENTS

| | | | |
|---|---|---|---|
| 37,196 | 12/1862 | Kelly | 279/76 X |
| 135,692 | 2/1873 | Correa | 85/7 |
| 2,974,966 | 3/1961 | Felmet | 408/241 B |
| 2,558,814 | 7/1951 | Briney | 408/241 B |
| 3,606,566 | 9/1971 | Bethke | 408/241 B |

Primary Examiner—Andrew V. Kundrat
Attorney, Agent, or Firm—Donn J. Smith, Esq.

[57] ABSTRACT

A keeper arrangement for a pin or shaft or the like, comprises a machine structure or like component having a counter-sunk recess intersecting a passage for the pin or shaft. The pin or shaft, when inserted into the passage, has a slot therein extending complementarily with the recess. A keeper plate is seated in the recess, where the plate is retained, and extends into the juxtaposed slot of the pin or shaft.

4 Claims, 2 Drawing Figures

PATENTED MAR 19 1974   3,797,949

KEEPER FOR RETAINING A PIN OR SHAFT

The present invention relates to a keeper arrangement for restraining a connecting, pivot, or locking pin, or a shaft in a desired position, and more particularly to an arrangement of the character described capable of positively locking the restrained item in place against both longitudinal and rotational movements. The invention is especially useful for locking large sized pins or shafts, for example in a range of one inch to eight & one-half inches in diameter and larger.

Previous practices for retaining large sized pins included use of a conventional keeper plate. The fastening bolts employed in conjunction with the keeper plate were subjected to severe shearing stresses and lacked moreover a proper bearing area between the keeper and the mating pin slot. In consequence the fastening bolts frequently failed. Another disadvantage of these known arrangements is the requirement of multiple keeper plate bolts.

The present invention provides a surprisingly more reliable keeper or locking arrangement for pins or shafts, particularly in the larger sizes. The keeper of the invention is designed substantially to prevent application of shearing stresses to the associated fastening bolt and also to provide a more adequate bearing area between the keeper and the mating pin slot. Further, the pin keeper of the invention is unexpectedly arranged to employ a single fastening bolt instead of a plurality of such bolts as required previously.

The keeper components are bolted to the equipment wherein the pin is to be retained and locked. Axial loads transmitted through the restrained pin or shaft are transposed to the fastening bolt of the keeper arrangement in the form of tensile stress loads rather than shear stresses. Torque loadings transmitted through the locked pin or shaft are transferred through a component of the pin keeper as compressive stresses to be absorbed in the keeper recess harmlessly as shear stresses. Other than the keeper recess, no component of the keeper arrangement is subjected to direct shear stresses as a result of torque loadings. Of course, axial loadings on the pin or shaft are transmitted to a keeper member as shear and bending stresses, but in further accord with the invention these stresses in turn appear only as tensile stresses in the aforementioned fastening bolt.

In consequence a convenient and easily removable pin locking arrangement is provided, which employs a minimum of component parts.

I overcome the difficulties of the prior art and accomplish these desirable ends by providing a keeper arrangement for a pin or shaft or the like, said arrangement comprising a machine structure or like component having a countersunk recess therein intersecting a passage for said pin or shaft, said pin or shaft, when inserted into said bore or passage, having a slot therein juxtaposed to said recess and extending complementarily therewith, a keeper plate seated in said recess and extending into said slot, and means for retaining said keeper plate in said recess and slot.

I also desirably provide a similar keeper arrangement wherein said retaining means include a single bolt inserted through an opening in said keeper plate and secured in a tapped aperture in said machine structure or component.

I also desirably provide a similar keeper arrangement wherein an outer surface of said keeper plate and a juxtaposed surface of said slot are disposed substantially flush with an outer surface of said machine structure or component.

I also desirably provide a similar keeper arrangement wherein said recess and said keeper plate and a complementary surface of said slot are of substantially circular configuration.

I also desirably provide a similar keeper arrangement wherein said keeper plate opening is sufficiently larger than an adjacent shank portion of said bolt such that application of torque forces to said pin or shaft can displace said keeper plate into bearing engagement with surfaces of said recess without application of significant shear stresses to said bolt.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

Figure 2:
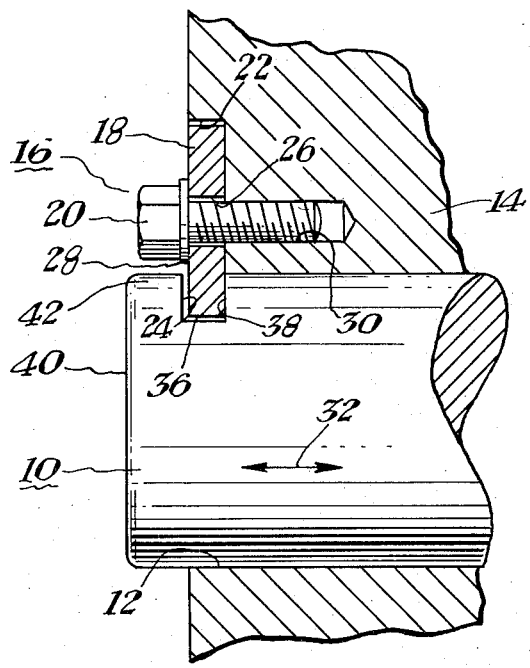

In the accompanying drawings I have shown certain presently preferred embodiments of the invention and have illustrated certain presently preferred methods of practicing the same, wherein:

FIG. 1 is a front elevational view of a pin or shaft selectable from a wide range of sizes and a keeper arrangement therefor, as provided by the invention; and FIG. 2 is a vertically sectioned view of the structure illustrated in FIG. 1 and taken along reference line II—II thereof.

With more detailed reference now to the drawings, a pin or shaft 10 to be restrained is mounted in a closely fitting bore or other suitable passage 12 therefor in a machine component, structure, or the like designated generally by the reference numeral 14. Juxtaposed to the pin or shaft is a keeper 16 arrangement for restraining the pin or shaft 10, and including in this example a circular plate 18 and retaining bolt 20. The keeper plate 18 is seated in a suitably shaped recess, in this case counterbore 22 formed in an adjacent surface portion of the machine component structure 14.

The counterbore 22, which can be slightly larger than the outer periphery of the keeper plate 18 but otherwise complementarily shaped, intersects the passage 12 in which the pin or shaft 10 is seated. At the intersection between the counterbore 22 and the shaft passage 12 the pin or shaft 10 is cut away at 24 to form a complementary recess or slot in continuation of the counterbore 22 in order to accommodate an inserted portion of the keeper plate 18. Although the keeper plate 18, recess 22 and slot 24 are of circular configuration, it will be apparent that some other shape can be used.

The keeper plate 18 is provided with a desirably central opening 26 for passage of the retaining bolt 20 therethrough. The keeper bolt 20, desirably with lock washer 28 thereon, is inserted into tapped aperture 30 therefor in the machine component or structure 14.

When the keeper plate 18 and keeper bolt 20 are thus secured, any substantial longitudinal or rotational movement of the pin or shaft 10 is positively prevented by engagement of the keeper plate 18 with the pin or shaft slot 24. Any tendency of the pin or shaft 10 to longitudinal movement (arrow 32, FIG. 2) is translated into tensile stresses in the keeper bolt 20 of compressive forces in the keeper plate 18. Similarly, the engagement between the keeper plate 18 and the pin or shaft slot 24 prevents substantial rotational movement (arrow 34, FIG. 1) by engagement of the adjacent edge portion 36 of the keeper plate 18 with the arcuate surfaces 38 of the pin or shaft slot 24. Thus, any torque forces applied to the pin or shaft 10 are translated through the keeper plate 18 as compressive forces and then to the counterbore surfaces 22 as shear stresses. Desirably the central opening 26 of the keeper plate 18 is sufficiently larger than the adjacent shank portion of the keeper bolt 20 such that the keeper plate 18 can shift into bearing contact as required with the juxtaposed surfaces of the counter-bore 22, without application of significant shear stresses to the keeper bolt 20.

As evident from the drawings, the pin or shaft keeper 16 can be quickly installed and removed and involves a minimum of component parts. The use of a single keeper plate 18 provides a larger bearing area between the keeper plate and the pin or shaft 10 at its slot 24. More importantly the keeper 16 can be reliably utilized for a wide range of shaft or pin diameters.

In a given application of the invention the diameter and/or length of the keeper bolt 20 can be varied depending upon the diameter of the pin or shaft 10, which, of course, in turn will vary with anticipated loading. Likewise, the outer diameter and/or thickness of the keeper plate 18 will vary with pin or shaft diameter. Similarly the depth or thickness of the slot 24, or its distance from adjacent end 40 of the pin or shaft 10 will vary with pin or shaft diameter.

For example with a pin or shaft 10 having a relatively smaller diameter than that illustrated (and a correspondingly lesser maximum loading) the keeper plate outer diameter and/or its thickness can be made smaller. Alternatively or in conjunction therewith the shank diameter and/or the length of the keeper bolt 16 can be smaller. Naturally the depth and/or the thickness of the pin slot 24 will be reduced in a complementary fashion with the corresponding dimensions of the keeper plate 18. At the same time, the pin slot 24 can be placed closer to the end surface 40 of the pin or shaft 10 without danger of breakage of the overhanging pin portion 42.

On the other hand if a pin or shaft of larger diameter (and correspondingly greater maximum loading) than that illustrated is to be retained, the corresponding dimensions of the pin slot 24, keeper plate 18 and keeper bolt 20 or some of them will be correspondingly increased. Likewise, and for equally obvious reasons, the pin slot 24 would be positioned correspondingly farther from the end surface 40 of the larger pin or shaft.

As evident from FIG. 2 the keeper arrangement 16 can be readily assembled or disassembled. In the absence of the mounting bolt 20 the pin 10 and the keeper plate 18 inserted into the pin slot 24 thereof can be simultaneously inserted into or withdrawn from the pin passage 12 and the counterbore 22 respectively. Securance of the keeper bolt 20 then retains the keeper plate 18 within its counterbore 22, in this example in a flush position, and also retains the pin or shaft 10 in its passage 12 as aforedescribed.

From the foregoing it will be seen that a novel and efficient Keeper for Retaining a Pin or Shaft has been described herein. The descriptive and illustrative materials employed herein are utilized for purposes of exemplifying the invention and not in limitation thereof. Accordingly, numerous modifications of the invention will occur to those skilled in the art without departing from the spirit and scope of the invention.

I claim:

1. A keeper arrangement for an otherwise rotatably mounted pin or shaft or the like, said arrangement comprising a machine structure or like component having a countersunk recess in an outer face thereof intersecting a passage for said pin or shaft, said pin or shaft inserted into said bore or passage and having a transverse slot therein juxtaposed to said recess and extending contiguously therewith, said recess and said slot being displaced from an adjacent end of said pin or shaft, a keeper plate seated in said recess and extending into said slot, and means inserted through an aperture in said keeper plate for retaining said keeper plate in said recess and slot, the difference in diameter between said keeper plate aperture and the means inserted therethrough being greater than the difference in diameter between the outer periphery of said keeper plate and said countersunk recess so that any substantial rotative movement of said pin or shaft causes the slotted portion thereof to engage said keeper plate and to displace said keeper plate into bearing engagement with a generally opposite wall of said recess such that substantially all torque forces applied to said pin or shaft must be translated through said keeper plate to said recess wall upon the displacement of said keeper plate without application of significant shear stresses to said retaining means.

2. The combination according to claim 1 wherein said retaining means include a single bolt inserted through said keeper plate aperture and secured in a tapped aperture in said machine structure or components, said keeper plate aperture and said tapped aperture being disposed centrally of said keeper plate.

3. The combination according to claim 2 wherein said recess and said keeper plate and a complementary surface of said slot are of substantially circular configuration.

4. The combination according to claim 1 wherein an outer surface of said keeper plate and a juxtaposed surface of said slot are disposed substantially flush with said outer face of said machine structure or component.

* * * * *